(12) United States Patent
Walter et al.

(10) Patent No.: US 7,896,057 B2
(45) Date of Patent: Mar. 1, 2011

(54) ROLLER BLIND FOR COMPLETE SHADING OF A MOTOR VEHICLE WINDOW

(75) Inventors: Herbert Walter, Ebersbach (DE); Werner Schlecht, Vaihingen/Enz (DE)

(73) Assignee: BOS GmbH & Co. KG, Ostfildern (DE)

( * ) Notice: Subject to any disclaimer, the term of this patent is extended or adjusted under 35 U.S.C. 154(b) by 557 days.

(21) Appl. No.: 11/640,566

(22) Filed: Dec. 18, 2006

(65) Prior Publication Data

US 2007/0144689 A1   Jun. 28, 2007

(30) Foreign Application Priority Data

Dec. 23, 2005   (DE) .......................... 10 2005 062 427

(51) Int. Cl.
  *B60J 3/00* (2006.01)
(52) U.S. Cl. ................................. 160/370.22; 160/273.1
(58) Field of Classification Search ............. 160/370.22, 160/273.1, 271, 272; 296/97.8
  See application file for complete search history.

(56) References Cited

U.S. PATENT DOCUMENTS

| | | | | |
|---|---|---|---|---|
| 5,201,563 | A * | 4/1993 | Liao | 296/97.4 |
| 5,551,744 | A * | 9/1996 | Liao | 296/97.4 |
| 6,086,133 | A | 7/2000 | Alonso | |
| 6,179,373 | B1 * | 1/2001 | Bohm et al. | 296/214 |
| 6,309,076 | B1 * | 10/2001 | McVicker | 359/601 |
| 6,598,929 | B2 * | 7/2003 | Schlecht et al. | 296/97.4 |
| 6,739,375 | B2 * | 5/2004 | Schlecht et al. | 160/370.22 |
| 6,899,380 | B2 * | 5/2005 | Kralik et al. | 296/214 |
| 6,926,062 | B2 * | 8/2005 | Neumann et al. | 160/371 |
| 7,059,651 | B2 * | 6/2006 | Bohm et al. | 296/97.11 |
| 2002/0033244 | A1 * | 3/2002 | Schlecht et al. | 160/370.22 |

FOREIGN PATENT DOCUMENTS

| | | |
|---|---|---|
| DE | 3345503 A1 | 6/1985 |
| DE | 197 39 919 A1 | 3/1999 |
| DE | 10019787 A1 | 10/2001 |
| DE | 10040624 A1 | 3/2002 |
| DE | 102004020531 B3 | 9/2005 |
| EP | 0834414 A2 | 4/1988 |
| EP | 1188591 A1 | 3/2002 |

OTHER PUBLICATIONS

European Search Report, dated May 15, 2007, for corresponding German Application No. 102005062427.8.
Office Action issued by German Patent Office in German counterpart application No. 10 2005 062 427.8, dated Jul. 9, 2009.

* cited by examiner

*Primary Examiner* — David Purol
(74) *Attorney, Agent, or Firm* — Leydig, Voit & Mayer, Ltd.

(57) ABSTRACT

A roller blind for motor vehicle windows which includes a roller blind body movable between a retracted stored posited and an extended position over the window with which it is used. The roller blind body has a width greater than at least portions of the rear window, with the excess portions of the roller blind body being movable into receptacles mounted in the vehicle body, thus preventing any possible light gap between the roller blind body and the side edges of the of window.

20 Claims, 3 Drawing Sheets

ROLLER BLIND FOR COMPLETE SHADING OF A MOTOR VEHICLE WINDOW

FIELD OF THE INVENTION

The present invention related generally to roller blinds, and more particularly, to roller blinds used to shade motor vehicle windows and sunroofs.

BACKGROUND OF THE INVENTION

From the state of the art, a plurality of roller blind arrangements are known, which are designed to shade a rear window of a motor vehicle. In modern car body shapes, the motor vehicle width in the region of the top edge of the roof at the rear window is significantly smaller than at the height of a midpoint. Due to this geometry, the rear window has an approximately trapezoidal shape. In current roller blind designs, guide rails are integrated into inner linings of car body columns bordering the rear window.

The flexible roller blind body or shade is adapted to the trapezoidal shape of the rear window so that it does not collide or interfere with the inner lining at any point. Due to this arrangement, a slight gap, which sometimes is considered to be aesthetically unappealing, usually is produced between the side edge of the roller blind body and the inner lining or the window side edge when the roller blind is drawn out.

OBJECT AND SUMMARY OF THE INVENTION

It is an object of the present invention to provide a rear-window roller blind assembly for motor vehicles in which the side gap is eliminated when the roller blind body or shade is drawn out independently of the geometry of the window.

In the inventive roller blind arrangement, which is especially adapted for use with rear windows of motor vehicles, like in the prior art, a rotatably mounted roller blind shaft is provided. The roller blind shaft is arranged next to one edge of the roller blind body of the motor vehicle window, preferably next to the bottom edge. A pull-out rod or profile, which is guided at its ends in two guide rails, is anchored at the other edge of the roller blind body. The two guide rails run parallel to the side edges of the rear window.

Pursuant to the invention, the roller blind body has a rectangular outline and projects laterally over the pull-out profile. The projecting part of the pull-out profile disappears into a receptacle next to the guide rail. Therefore, in every position of the roller blind body, the window is covered from one side edge to the other side edge by the roller blind body.

It is advantageous to provide additional receptacles, in which the projecting part of the roller blind body is held, next to the guide rails. According to the shape, in every position of the roller blind body, a part of the roller blind can be contained in the receptacle or else during the movement of the roller blind body, the side edge region of the roller blind body is pushed increasingly into the receptacle.

The arrangement according to the invention can be used not only with windows in which the side edges converge in the direction towards the top edge, but also those that are essentially rectangular, wherein the side edge region of the roller blind body is always contained in the receptacle pockets over the entire path of motion of the roller blind body between retracted and extended position.

A very clean, unbroken appearance, especially from the interior of the motor vehicle, is produced if the receptacles for the lateral excess of the roller blind body are arranged underneath or behind the guide rails, as viewed from above or from the outside. In the view from the inside to the outside, the guide rails are covered by the roller blind body, and an especially smooth, aesthetic transition is produced from the roller blind body to the side lining of the C-columns in a four-door sedan.

When the rear window has a trapezoidal shape, the depth of the receptacles changes, preferably viewed in the direction of extension, in order to be able to hold the corresponding increasing excess. The receptacles need not necessarily extend directly up to the wind-up shaft. It is sufficient for the receptacles to begin at a distance sufficiently close to the wind-up shaft, but not underneath the rear-seat shelf, so that the entry of the roller blind body begins underneath the rear-seat shelf.

In order for the roller blind body to enter the receptacles without a problem, the receptacle can have a deflection edge on the relevant side that corresponds to the entry opening, while a stop or sliding surface is provided on the opposite side. This stop or limit surface preferably lies parallel to the adjacent side wall of the motor vehicle and thus between the inner lining and the bare car body.

The pull-out profile of the roller blind body preferably is provided with reinforcement, such that the edge is resistant to bending in the direction parallel to the movement of the roller blind body, but is flexible in the direction perpendicular to this movement. Therefore, the force exerted on the roller blind body by the pull-out profile also is transmitted to the part of the roller blind body, which is no longer tied directly to the pull-out profile, because it projects laterally past the profile. This bend-resistant arrangement is obtained, in the simplest case, by a leaf spring piece being connected to the roller blind body edge. The assembly relationships are especially simple when the edge of the roller blind body is provided with a continuous hose-shaped loop or a bend in which a leaf-spring strip is placed.

In the roller blind assembly according to the invention, the drive can be effected in a way that is typical for such roller blinds. The movement of the pull-out profile is effected, for example, with drive elements/cables, which are guided within the guide rails so that they cannot bend. The drive elements are connected to a linear-drive device, which in the simplest case is configured as a Bowden-cable pull and which is composed of, for example, a linear drive element with wrap-around teeth. These teeth mesh with a pinion on an output shaft of a gear motor according to the pitch. The winding of the roller blind body on the wind-up shaft can be implemented with the aid of a spring motor, which pretensions the wind-up shaft in the sense of winding-up the roller blind body.

Other objects and advantages of the invention will become apparent upon reading the following detailed description and upon reference to the drawings, in which:

BRIEF DESCRIPTION OF THE DRAWING(S)

Figure 1:
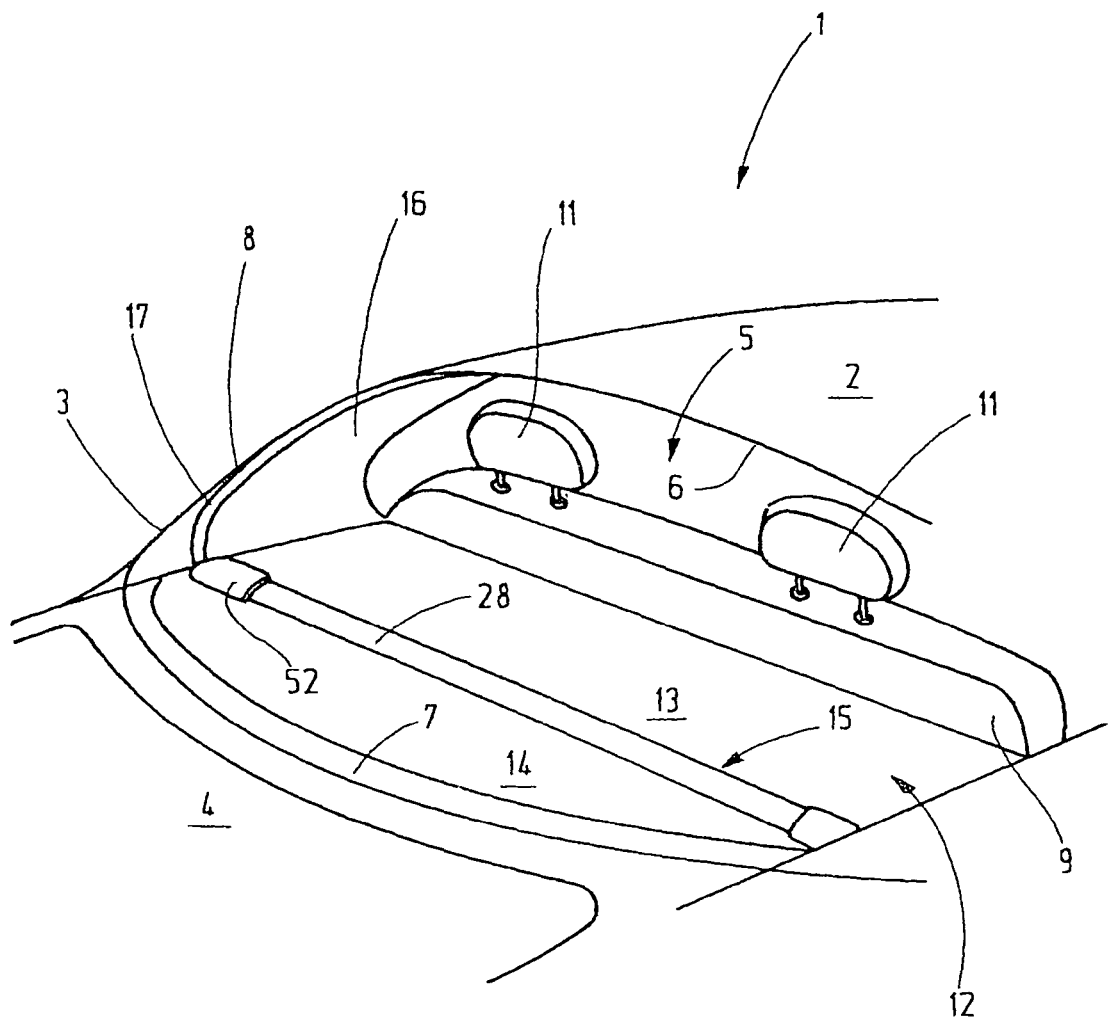
FIG. 1 is a partial perspective of a motor vehicle having a rear window roller blind assembly in accordance with the invention.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

Referring now more particularly to FIG. 1 of the drawings, there is shown an illustrated motor vehicle 1 having a roller blind assembly in accordance with the invention. The motor vehicle, as depicted in FIG. 1, has a roof 2, a left C-column 3, and a trunk cover 4. A right C-column corresponding to the left C-column 3 is cut away, and hence, is not visible in FIG. 1. Above the trunk cover 4, the vehicle has a rear window 5 which is boarded by a top edge 6, a bottom edge 7, and two side edges 8 defined by a component of the C-column 3.

In the interior of the motor vehicle 1, a rear-seat has a backrest 9 with headrests 11. Between the rear side of the backrest 9 and the bottom edge 7 there is a rear-seat shelf 12, which is divided into two sections 13 and 14 by a pull-out slot. The slot, which extends over the entire width of the rear-seat shelf 12, is covered by a pull-out rod or profile 15 of the roller blind assembly. On the inside of the C-column 3, an inner lining 16 is provided that has a slot 17, which begins at the slot in the rear-seat shelf 12, and from there approaches the side edge 3 and otherwise follows the course of the side edge 3 up to the top edge 6.

The pull-out profile 15 is part of a rear-window roller blind assembly 18. The illustrated roller blind assembly 18 includes the pull-out profile 15 affixed to one edge of a flexible roller blind body or shade 19, a wind-up shaft 21 affixed to the opposite edge of the roller blind body or shade 19, two guide rails 22, 23 disposed on opposite sides of the wind-up shaft 21 and pull-out profile 15, and a gear motor 24.

Figure 2:
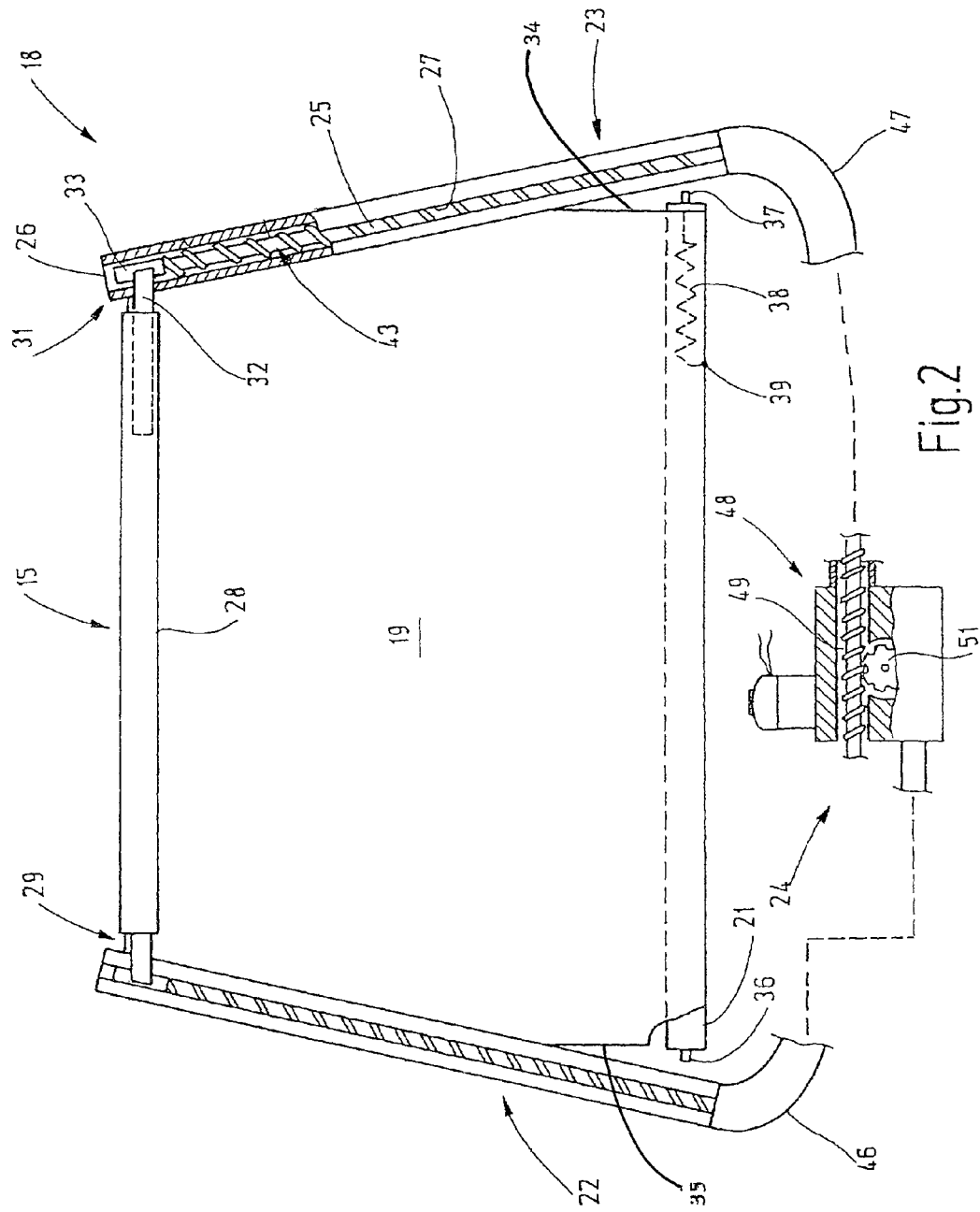
FIG. 2 is a plan view, in partial section, of the illustrated roller blind assembly.

The guide rails 22, 23 are arranged behind the inner lining 16 in the vicinity of the slot 17 and follow its course. In FIG. 2, they are shown straight for reasons of simplicity and clarity. The essential feature that will be appreciated is that, in the projection onto the plane of the drawing, the distance between the guide rails 22, 23 in the bottom region, that is, where they emerge from the rear-seat shelf 12, is greater than that in the region of the top edge 6 of the rear window 5.

The two guide rails 22, 23 have the same construction, and hence, a detailed description need only be with reference to the guide rail 23. The guide rail 23 contains a guide groove 25, whose cross section is defined by a groove chamber 26 and a groove slot 27. The groove slot 27 has a smaller width than the groove chamber 26, which has a circular cross section. The groove slot 25 opens in the direction towards a side of the rear window 5.

The pull-out profile 15 is assembled from a middle piece 28 having a fixed, rigid length and two end pieces 29, 31, which can move with a telescoping motion relative to the middle piece 28. Because the two end pieces 29, 31 are mirror-symmetrical, again it is sufficient to explain only one in detail, which applies analogously to the other end piece.

The end piece 31 includes a bar 32 which is constructed with a flat end and is longitudinally movable in a receptacle space within the middle piece 28, as indicated by dashed lines in FIG. 2. The bar 32 is guided so that it cannot rotate relative to the middle piece. Preferably, the receptacle space is constructed as a continuous channel and receives an end piece 29 at the opposite end of the middle piece 28, which can similarly move longitudinally.

The bar 32 is angled on its free end projecting from the middle piece 28, being oriented downwardly in the direction of the slot 27 and for positioning into the slot 27 of the guide groove 25. A sliding piece 33 is fixed to the bar 32 within the guide groove 25 and has a shape that matches the cross section of the guide chamber 26. The thickness of the bar 32 is dimensioned so that it can run without jamming in the guide slot 27.

The roller blind body 19 has a rectangular outline with two side edges 34, 35. The width of the roller blind body 19 is at least as wide as the distance that separates the two inner lining parts 16 on the C-columns from each other at the height of the slot in the rear-seat shelf 12. Thus, the width is greater than the distance that separates the side lining parts 16 on the C-columns 3 from each other underneath the top edge 6 of the rear window 5. This situation is depicted in FIG. 2, in that in the lower region, the distance between the two guide rails 22, 23 is somewhat greater than the width of the roller blind body 19, while in the upper region, the distance between the guide rails 22, 23 is smaller than the width of the roller blind body 19. In other words, the two guide rails 22, 23 intersect the side edges 34, 35 of the roller blind body 19 lying underneath or, relative to the vehicle body in front.

At the bottom end, the roller blind body 19 is fixed in a known way to the wind-up shaft 21, which is rotatably mounted by means of pins 36, 37 underneath the rear-seat shelf 12 in the motor vehicle 1. The pin 37 also is used for anchoring of a spring motor 38, which is arranged in the interior of the wind-up shaft 21, the inner end of which is locked for rotation with the wind-up shaft 21 at 39. The wind-up shaft 21 is pre-tensioned in the sense of winding the roller blind body 19 onto the wind-up shaft 21 with the aid of the spring motor 38.

The edge of the roller blind body 19 lying away from the wind-up shaft 21 is provided with a bend 41, which is continuous over the length and which can also be closed to form a hose-shaped loop. In this bend 41, or loop, there is a leaf spring 42, which extends from the side edge 34 to the side edge 35. The leaf spring 42 ensures that the edge of the roller blind body 19 is essentially rigid in the direction parallel to the plane of the drawing, and thus in the direction of motion during extension and retraction, while being relatively easily flexible in the direction perpendicular to the plane of the drawing and thus perpendicular to the surface spanned by the extended roller blind body 19.

With the bend 41 and the leaf spring 42 lying in this bend, the roller blind body 19 is anchored in the middle piece 15. For this purpose, the middle piece contains a slot, which is open in the direction towards the roller blind body 19 and in which the roller blind body 19 is, for example, glued to the bend 41.

The channel for the end pieces 29, 31 is closer to the rear window 5 than is the receptacle slot for the bend 41, relative to the true installation relationships. Viewed from the side, the guide rails 22, 23 extend between the bars 32 and the bend 41.

With the aid of the leaf spring 42, the forward motion introduced into the middle piece 28 when the roller blind body 19 is extended is also transmitted to the side regions of the roller blind body 19 that are not connected to the middle piece 28, thereby preventing the folding, among other things, of the flexible roller blind body 19. The latter is typically made from a perforated sheet or netting material or another essentially flexible base material that is suitable for roller blinds.

To be able to set the roller blind body 19 in tension in front of the rear window 5, in each guide chamber 26 of the two guide rails 22, 23 there runs a flexible linear push element 43. The push element 43 is assembled from a core 44 with a circular cross section and a coil 45 running on the outside of the core 44. On the outside of the core 44, the coil 45 forms continuous, helical teeth extending over the length. In other words, the push element 43 is a flexible toothed rack with teeth extending around the push element. The push element 43 pushes against the adjacent end of the sliding piece 33 on each side.

The two push elements 43 are moved by means of the gear motor 24 through guide tubes 46, 47 leading between the gear motor 24 and the bottom end of each guide rail 22, 23. The gear motor comprises a gear housing 48, through which two boreholes 49 pass. Of these boreholes, only one can be seen due to the partially cutaway view. These boreholes 49 run tangentially past an output gear 51, which engages the teeth of the push element. Because the two push elements mesh with the same output gear 51 on diametrically opposite sides, they are each moved the same amount in the opposite direction when the output gear 51 is turned. The unnecessary part of each push element 43 extends into a storage tube.

Figure 3:
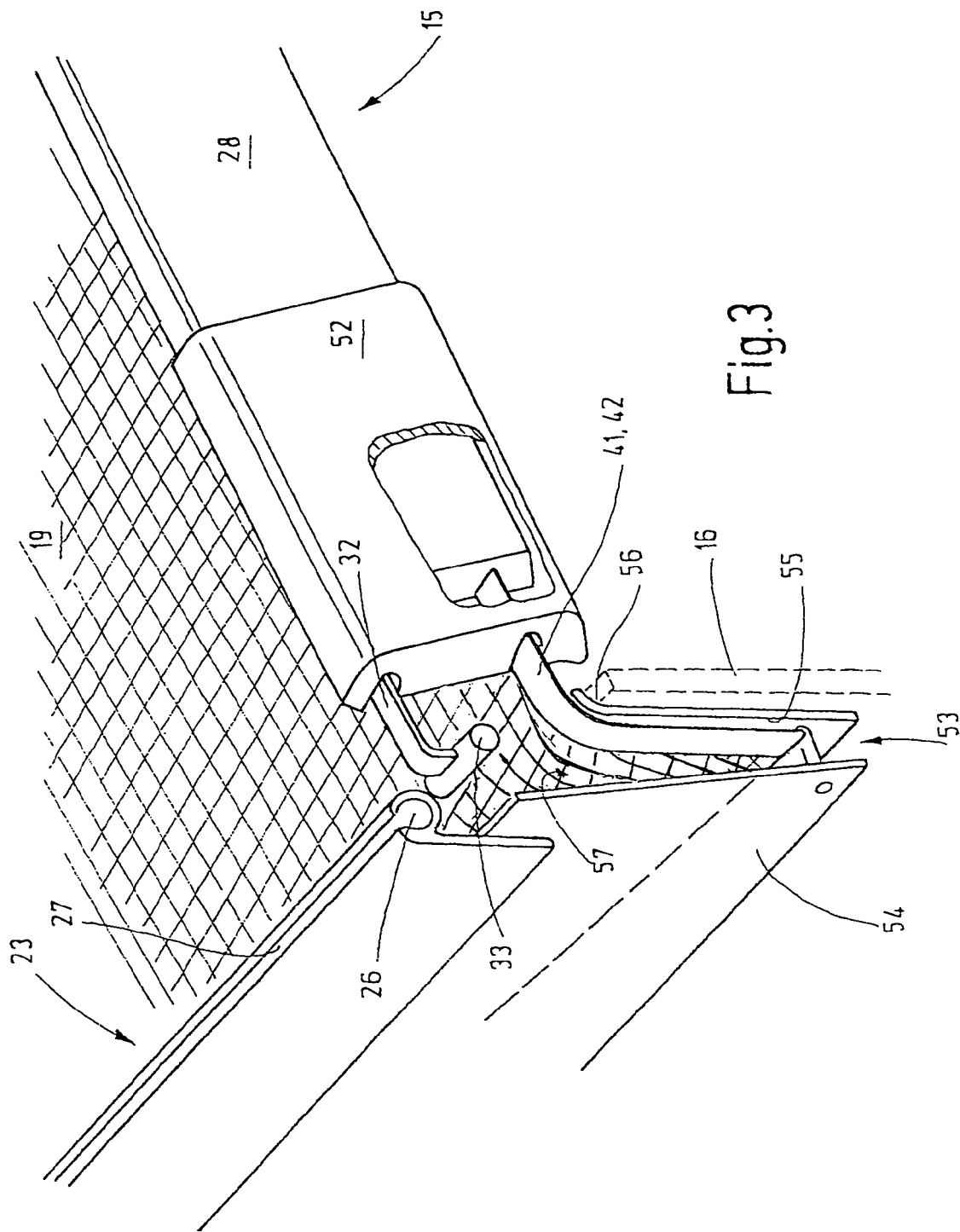
FIG. 3 is an enlarged fragmentary perspective depicting insertion of an edge of the roller blind body into an associated receptacle during operation.

In keeping with the invention, the side regions of the roller blind body 19 projecting past the middle piece 28 of the pull-out profile 15 are stored when the roller blind body 19 is in the vicinity of the upper end of the two guide rails 22, 23, as depicted in FIG. 3. It will be understood that on the other side of the roller blind body 19, opposite to that depicted in FIG. 3, there is a mirror-symmetrical arrangement made up of the guide rail and receptacle. In addition, it can be seen that the end pieces 29, 31 are covered by caps 52, which are connected to the bars 32, in order to effect an aesthetic extension of the shape of the middle piece 28.

Between the inner lining 16 and the bare car body, which is not shown in FIG. 3, there is a fissure-type receptacle 53. The receptacle 53 is accessible, just like the guide rail 23, through the slot 17. It lies with its flat side parallel to the surface defined by the inner lining 16 and thus also essentially parallel to the side wall of the motor vehicle 1.

The receptacle 53 is defined by two strip-shaped plates 54, 55 connected to each other. The plate 54 extends, as shown, directly into the vicinity of the guide rail 23, while the plate 55 is lower, in the direction towards the guide rail 23. It ends with a smoothly curving deflection edge 56. In this way, a run-in slot 57, which is open in the direction towards the bottom side of the guide rail 23 and in the direction through the slot 17, i.e., diagonally upwards, is produced between the deflection edge 56 and the plate 54. The plate 54 is smooth on its side facing the roller blind body 19 and is used as a sliding surface, as will become apparent below.

In the retracted state of the rear-window roller blind 18, the roller blind body 19 is almost completely wound onto the wind-up shaft 21, with the pull-out profile 15 lying on the rear-seat shelf 12, as shown in FIG. 1. Because there is sufficient space next to the rear-seat shelf in that state, the roller blind body 19 projects with the bends 41 in the corresponding slots 17 up to where they extend underneath the rear-seat shelf 12.

Because the gap-shaped receptacle 53 follows the profile of the side edge 8 of the rear window 5 on each side and is offset over the entire length outwards over the relevant side edge 8 up to the outer skin of the car body, no force is exerted on the roller blind body 19 in the region of the bend 41. The push elements 43 are retracted or pushed forward only as far as they just contact the sliding pieces 33 in this operating position.

Starting from this retracted position, if the user wishes to shade the rear window 5, he sets the gear motor 48 in operation by activating the corresponding switch. The output gear 51 rotates in the clockwise direction, as shown in the illustrated embodiment, and pushes the two push elements 43 in the direction towards the associated guide rail 22, 23. The two push elements 43 push the sliding pieces 33 ahead of themselves and thus move the pull-out profile 15 from the rear-seat shelf 12 in the direction towards the window top edge 6. Because the two guide rails 22, 23 converge, the end pieces 29, 31 are pushed into the middle piece 28 in a telescoping motion.

Simultaneously during this motion, the distance that separates the sliding surfaces of the plates 54 of the two receptacles 53 from each other continuously decreases from the standpoint of the roller blind body. The ends of the bend 41 and the side edges 34, 35 are thus inserted more deeply into the run-in slot 57 of the two lateral receptacles 53. At some point during the course of the motion, they push against the flat side of the plate 54 facing the pull-out profile 15 or the inner lining 16. Through corresponding alignment of the sliding surface relative to the longitudinal axis of the pull-out profile 15, the ends of the leaf spring 42 contained in the bend 41 are forced downwardly, as viewed in FIG. 3. The side of the roller blind body 19 facing the passenger compartment is held on the curved deflection edge 56.

For further motion, the leaf spring slides with its free end on the relevant side, as FIG. 3 shows, increasingly more deeply into the adjacent receptacle 53. Due to the restoring force, it contacts, on one side, the deflection edge 56 and, on the other side, the plate 54.

In this way, the receptacle 53, which is present on each side of the roller blind body 19, takes up any potential triangular area of the roller blind body 19 that extends increasingly outwards past the slot 17 in the inner lining 16 during the pulling-out of the roller blind body, starting from the retracted position. These triangular regions are folded forward behind the inner lining 16 according to the particular vehicle geometry.

Based on this arrangement, in each extended position of the rear-window roller blind 18, the roller blind body extends without a visible light gap from one inner lining 16 on one side to another inner lining 16 on the opposite side. It comes out of the inner lining 16 without a light gap and disappears on the opposite side, also without a light gap, into the slot 17 provided at this position.

In order that the unfolding movement of the leaf spring 42 is not obstructed and the leaf spring becomes compressed, the plate 54 extends with its sliding surface facing the pull-out profile 15 at an angle that is different from 90° relative to the plane of the roller blind body 19. Therefore, a corresponding preferred bending direction is forced on the leaf spring 42.

The rear-window roller blind 18 is retracted in the reverse sequence, in that the two push elements 43 are pulled back from the guide rails 22, 23 with the aid of the geared motor 24. The pull-out profile 15 is then moved back either exclusively by the spring motor 38 or by the push elements 43, which then act as pulling elements and are connected, for example, with a positive fit to the sliding pieces 33. During the retraction motion, the distance between the receptacles 53 continuously expands from the view of the roller blind body 19, so that the leaf spring 42 is pulled out accordingly over the deflection edge 56. The leaf spring 42, as indicated above, ensures that the roller blind body 19 is driven over the entire width and not only in the region of the middle piece 15. Thus, effectively, it is also driven in each region located in the relevant receptacle 53 in the extended state.

The invention has been shown in the drawings with reference to the geometry of a motor vehicle in which the rear window becomes narrower in the direction towards the roof. The design according to the invention can also be applied to rear windows with practically rectangular approximation so that in every position of the roller blind body 19 the leaf spring is always bent and projects into the associated receptacle 53, both in a position close to the wind-up shaft and also in a position corresponding to the completely extended position.

From the foregoing, it can be seen that the motor vehicle roller blind of the present invention has a roller blind body, the width of which is greater than the open width between the inner lining parts at the rear window of the motor vehicle with which it is used. The excess parts of the roller blind body is held in slot-shaped receptacles or pockets, which are located between the bare car body and the inside of the inner lining. In this way, any light gap between the inner lining and a side edge of the roller blind body is prevented because the side edge of the roller blind body is always held behind the inner lining.

The invention claimed is:

1. A rotatable roller blind assembly (18) for motor vehicle windows (5) comprising:
    a rotatable roller blind shaft (21) mountable adjacent one edge (7) of a motor vehicle window (5),
    a roller blind body (19) fixed at one edge to the wind-up shaft (21),
    a pull-out profile (15) fixed to a second edge of the roller blind body (19) opposite said one edge,
    a pair of guide rails (22, 23) mountable adjacent opposite side edges (8) of the motor vehicle window (5) adjacent to which the roller blind shaft (21) is mountable for guiding movement of the pull-out profile (15) and the roller blind body (19) from the wind-up shaft (21) from a retracted position to an extended position overlying an adjacent motor vehicle window (5),
    said guide rails (22, 23) extending at an acute angle to each other and being spaced apart a greater distance at a point adjacent the windup shaft (21) then at a location corresponding to the extended position of the pull-out profile,
    said pull-out profile (15) including a middle piece (28) of fixed length and two end pieces (29, 31) which are guided for movement in said guide rails (22, 23) and are disposed for relative movement within opposite ends of the middle piece (28),
    said edge of the roller blind body (19) fixed to said pull-out profile (15) having a transverse width measured along and parallel to the pull-out profile (15) that is greater than the lateral spacing between the guide rails at the location corresponding to the extended position of the pull-out profile, said middle piece having a length less than the spacing between said guide rails at the location corresponding to the extended position of the pull rod, said pull-out profile middle piece having bendable members fixedly thereto in outwardly extending relation from opposite ends of the middle piece, said second edge of said roller blind body being fixed to said pull-out profile middle piece and bendable outwardly extending members, said outwardly extending bendable members being
    rigid with respect to forces exerted in the plane of the roller blind body in the direction of movement of said pull-out profile between said extended and retracted positions and are bendable from an extended position relative to the middle piece in response to forces exerted perpendicular to the plane of the roller blind body for reducing the transverse width of the roller blind body in conformity with a reduced spacing of the guide rails as an incident to movement of the pull out profile and roller blind body to said extended position.

2. The roller blind assembly of claim 1 including a receptacle (53) adjacent each guide rail (22, 23) having an access slot (57) for receiving a portion of the roller blind body (19) when in the extended position.

3. The roller blind assembly of claim 2 in which said access slot (57) of each receptacle extends underneath a respective adjacent guide rail (22, 23).

4. The roller blind assembly of claim 2 in which said receptacle (53) extends from said wind-up shaft (21) to an end of said guide rail away from said wind-up shaft, and said receptacle has a varying depth which is smallest at the wind-up shaft and greater at the end of the guide rail away from the wind-up shaft.

5. The roller blind assembly of claim 2 in which said receptacle (53) defines a deflections edge (56) about which an extended portion of said roller blind is bendable and a limiting surface (54) spaced from the deflection edge (56) for guiding the extended portion of the roller blind body into said receptacle.

6. The roller blind assembly of claim 1 in which said roller blind body has a rectangular shape.

7. The roller blind assembly of claim 1 in which said roller blind body (19) has a width at least as large as the windup shaft (21) at every point along its lateral edges.

8. The roller blind assembly of claim 1 in which said bendable member is a flat sided leaf spring (42) is inserted into the bend (41) of the roller blind body.

9. The roller blind assembly of claim 8 in which said leaf spring (42) has flat sides parallel to a flat surface of the roller blind body (19) when in the extended position.

10. The roller blind assembly of claim 8 in which said leaf spring (42) extends substantially the length of the pull-out profile (15).

11. The roller blind assembly of claim 1 including a drive device (38) for returning the roller blind body (19) from an extended position into a wound-up position on said roller blind shaft (21).

12. The roller bind assembly of claim 9 in which said drive device (38) is a spring motor coupled to said roller blind shaft (21).

13. The roller blind assembly of claim 1 in which each guide rail (22, 23) has a guide groove the cross section of which defines a groove chamber (26) and a groove slot (27), with the width of the groove slot (27) being smaller than the width of the groove chamber (26).

14. The roller bind assembly of claim 13 in which said groove chamber (26) has a circular cross-section.

15. The roller blind assembly of claim 13 in which said pull-out profile (15) end pieces (29,31) include sliding pieces (33) at opposed ends adapted for sliding movement within the groove chambers (26) of the guide rails (22, 23).

16. The roller blind assembly of claim 13 including linear drive elements (43) guided within the groove chambers (26) of the guide rails (22, 23) for moving said pull-out profile and roller blind body to the extended position.

17. The roller blind assembly of claim 16 including a gear motor (46) for driving said linear drive elements (43).

18. The roller blind assembly of claim 1 in which said reinforcements are spring members next to opposite lateral ends of said pull-out profile.

19. A motor vehicle comprising a motor vehicle body having a window with a non-rectangular configuration having a width at the top that is less than the width at the bottom, a rotatable roller blind assembly (18) having a rotatable roller blind shaft (21) mounted adjacent one edge (7) of the window (5),
    a roller blind body (19) fixed at one edge to the wind-up shaft (21),
    a pull-out profile (15) fixed to a second edge of the roller blind body (19) opposite said one edge, a pair of guide rails (22, 23) disposed adjacent opposite side edges (8) of the motor vehicle window (5) for guiding movement of the pull-out profile (15) and the roller blind body (19) from the wind-up shaft (21) from a retracted position to an extended position overlying the motor vehicle window (5), said guide rails (22, 23) extending at an acute angle to each other and being spaced apart a greater distance at a point adjacent the windup shaft (21) then at a location corresponding to the extended position of the pull-out profile, said pull-out profile (15) including a middle piece (28) of fixed length and two end pieces (29, 31) which are guided for movement in said guide rails (22, 23) and are disposed for relative movement within opposite ends of the middle piece (28), said edge of the roller blind body (19) fixed to said pull-out profile (15) having a transverse width measured along and parallel to the pull-out profile (15) that is greater than the lateral spacing between the guide rails at the location corresponding to the extended position of the pull-out profile, said middle piece having a length less than the spacing between said guide rails at the location corresponding to the extended position of the pull rod, said pull-out profile middle piece having bendable members fixedly thereto in outwardly extending relation from opposite ends of the middle piece, said second edge of said roller blind body being fixed to said pull-out profile middle piece and bendable outwardly extending members, said outwardly extending bendable members being rigid with respect to forces exerted in the plane of the roller blind body in the direction of movement of said pull-out profile between said extended and retracted positions and are bendable from an extended position relative to the middle piece in response to forces exerted perpendicular to the plane of the roller blind body for reducing the transverse width of the roller blind body in conformity with a reduced spacing of the guide rails as an incident to movement of the pull out profile and roller blind body to said extended position.

20. The motor vehicle of claim 19 in which said guide rails (22, 23) are mounted on inner lining parts (16) of the motor vehicle (1).

* * * * *